A. POCHWADT.
ARTIFICIAL DENTURE.
APPLICATION FILED APR. 18, 1913.
1,094,746.
Patented Apr. 28, 1914.
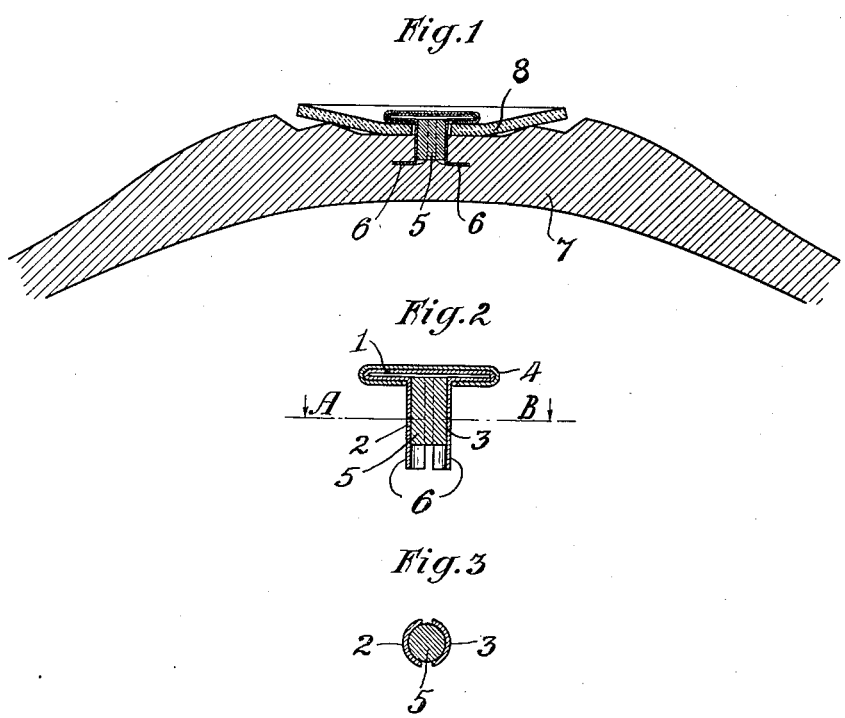

UNITED STATES PATENT OFFICE.

ADOLF POCHWADT, OF BERLIN-SCHÖNEBERG, GERMANY.

ARTIFICIAL DENTURE.

1,094,746. Specification of Letters Patent. Patented Apr. 28, 1914.

Application filed April 18, 1913. Serial No. 762,076.

*To all whom it may concern:*

Be it known that I, ADOLF POCHWADT, a subject of the German Emperor, residing at Berlin-Schöneberg, Germany, have invented certain new and useful Improvements in Artificial Dentures, of which the following is a specification.

For fixing dental plates to the palate of the mouth there are employed the well known round rubber suction plates, which are fastened by means of a headed stud of rubber or a screw or a metal complete hollow body projecting from the dental plate. These fastenings have been vulcanized into the rubber plate of a set of teeth. The rubber heads which have been made in one piece with the rubber plate are very liable to break off; the fastening of the screw was only possible, for instance by means of a specially vulcanized nut, while other hollow bodies and the like had only a beaded in edge.

The present invention consists of the improved means for fastening the rubber suction plate of a denture.

Figure 1 is a view of the suction cup in place, Fig. 2 is a sectional view of the rivet, and Fig. 3 is a section of the rivet on the line A—B of Fig. 2.

The fastener consists of a suitably shaped member stamped out from a piece of metal and comprising the portion 1 bent back upon itself to form the head, and the parallel extensions 2 and 3 forming the shank. By means of a die the end portions 2 and 3 are given a semicircular shape as shown in Fig. 3. The round head 1 of the rivet is next covered with a thin plate 4 of precious metal by bending the latter over and around the edge, as seen at Figs. 1 and 2. The hollow shank which is open at the bottom is filled with an insertion or core 5 which may be composed of metal or other material as desired, by which means the shank cannot get filled with rubber. The rivet projects from the finished dental plate mold which latter may have any suitable shape. The projecting parts 6 of the rivet shank may be bent over outwardly as desired, in order to give a firm anchorage in the dental plate 7 as shown in Fig. 1 and to hold the suction plate 8 securely thereto.

The above mentioned construction allows of dispensing with the nut that otherwise has to be vulcanized in, so that considerable material and expense is saved, because in the improved system the rivet is made from a non-precious metal.

In order to prevent the solid body inset into the rivet shank from falling out of the slit hollow cylinder formed as above described, it is advisable to fasten it in by beading, indenting, soldering or like means. The insertion of the entire rivet into the dental plate mold may be effected as hitherto usual by means of the well known suction chamber molds.

The improved fastener or rivet is superior as regards cheapness, simplicity and strength to the fasteners hitherto used for the same purpose.

Having now described my invention, what I claim as new and desire to secure by Letters Patent is:—

In combination, a dental plate, a rubber suction plate and a member for securing said plates comprising a head, a slit hollow cylindrical shank integral with said head and open at the bottom, a thin tightly-fitting covering plate for said head, an insertion between the shank members extending to the bottom of the shank, and outwardly bent ends to the shank members, substantially as described.

In testimony whereof I affix my signature in presence of two witnesses.

ADOLF POCHWADT.

Witnesses:
 WOLDEMAR HAUPT,
 HENRY HASPER.

Copies of this patent may be obtained for five cents each, by addressing the "Commissioner of Patents, Washington, D. C."